United States Patent [19]
Szu et al.

[11] Patent Number: 5,909,965
[45] Date of Patent: Jun. 8, 1999

[54] RECIRCULATION PATH UNIT FOR LINEAR ROLLING BEARINGS

[75] Inventors: Kou-I Szu; Kuo-Jung Chang; Shyh-Shiuh Lih; Wu-Chang Hsu, all of Taichung, Taiwan

[73] Assignee: Hiwin Technologies Corp., Taichung, Taiwan

[21] Appl. No.: 08/928,646

[22] Filed: Sep. 12, 1997

[51] Int. Cl.⁶ .................................................. F16C 29/06
[52] U.S. Cl. ............................................. 384/43; 384/45
[58] Field of Search .................................. 384/43, 44, 45

[56] References Cited

U.S. PATENT DOCUMENTS

| | | | |
|---|---|---|---|
| 4,505,522 | 3/1985 | Tanaka | 384/45 |
| 4,610,488 | 9/1986 | Geka | 384/45 |
| 4,652,147 | 3/1987 | Geka | 384/43 |
| 4,795,272 | 1/1989 | Mottate | 384/45 |
| 5,649,770 | 7/1997 | Kuo | 384/45 |

*Primary Examiner*—Thomas R. Hannon
*Attorney, Agent, or Firm*—Bacon & THomas, PLLC

[57] ABSTRACT

A linear recirculation path unit for a roller bearing includes a linear loading passage, a linear unloading passage, and two direction reversing passages connected to the ends of the linear passages. Instead of simply designing the reversing passages so that the slopes or tangents of the linear and reversing passages are continuous at the connecting points, the reversing passages are arranged so that not only the slopes but also the curvatures of the linear and reversing passages vary continuously throughout the recirculation path, thereby reducing centrifugal acceleration of the rolling elements in the path, with consequent reductions in impact forces on walls of the passages, sliding function, and vibration induced noises.

9 Claims, 18 Drawing Sheets

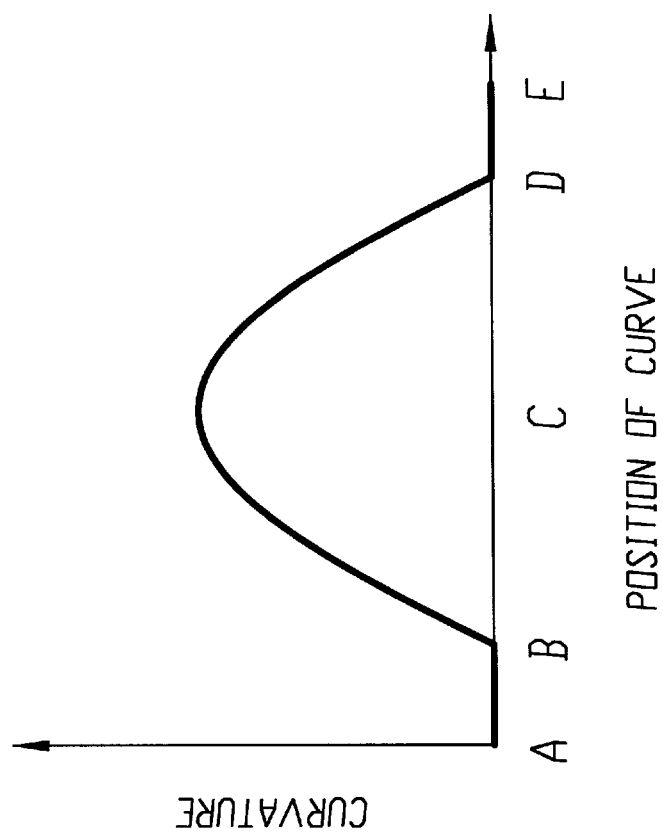
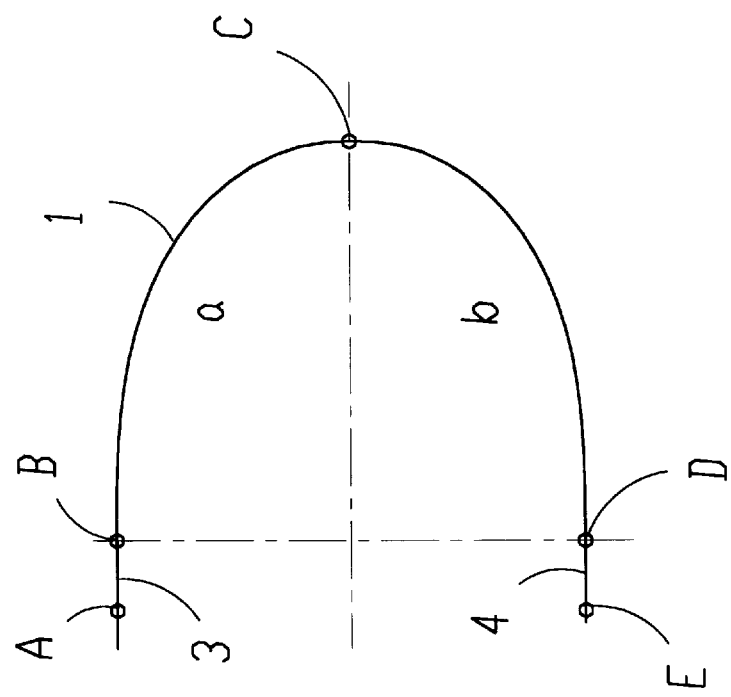
FIG. 6B
FIG. 6A

RECIRCULATION PATH UNIT FOR LINEAR ROLLING BEARINGS

BACKGROUND OF THE INVENTION

1. Field of the Invention

The present invention is a recirculation path unit of a linear rolling bearing. The unit includes a linear loading passage, a linear unloading passage, and two directional reversing passages, which are connected to the linear loading and unloading passages, to form a closed recirculation path within which rolling elements perform an infinite motion. The methodology of designing the reversing passages of the present invention is based on the continuity of the curvature, which is expected to be able to vary from zero to an assigned value and vice versa, at the connecting points to the loading and unloading linear passages. As a result, not only the continuity of the slope of the tangential lines at the vicinity of the connecting points but also the continuity of the curvature of the whole circulation path can be ensured. The continuity of the curvature provided by the present invention eliminates abrupt changes in centrifugal acceleration at the spots where the rolling elements enter or leave the reversing passage, thus reducing the impact force acting on the wall of the directional reversing passage by the element, the sliding function forces and noise induced by the vibration under high-speed operation conditions.

2. Description of the Prior Art

The design of the conventional reversing passages for the rolling elements in a linear bearing emphasizes the direction reversing function, with the goal of making the curves be tangent to each other at the connecting points, by forming the reversing passages through the connection of straight lines, circular arcs or elliptic arcs in order to cause the slope to be made the same at the connecting points. However, from a dynamic point of view, failure to take into account the continuity of a curvature at the connecting point, results in an abrupt change in the centrifugal acceleration and a tremendous impact force that acts on the turning wall, inducing sliding function, vibrations, and noise for a rolling element moving with a high speed in the reversing passage.

U.S. Pat. No. 4,296,974 provides an example of such a structure, which is illustrated in FIG. 11A of the present application where a reversing passage 1 consists of a semi circular arc with radius R and the passage is tangent to the other two linear passages in the connecting points. As the rolling element 2 moving from the loading passage 3 to the circular arc 1, the curvature of the passage changes abruptly from zero to 1/R at point B. Similarly, the curvature of the passage changes also abruptly from 1/R to zero at point C. Besides the above mentioned semi circular arc, a reversing passage design composed of two pieces of one-quarter circular arcs and a piece of straight line segment is disclosed in U.S. Pat. No. 4,505,522, which is represented by FIG. 12A of the present application. Although the slopes of these two reversing passages of this design are continuous at the connecting point, the inferior characteristic of the convention design such as the impact force, sliding function, vibration and noise caused by ignorance of the continuity of the curvature at the connection point remain the same. This can be seen through the curvature variation of these cases shown in FIGS. 11B and 12B.

An effort to improve the conventional design is disclosed U.S. Pat. No. 4,652,147, in which two or more curves with different curvatures are used to design the reversing passage circuit in a linear bearing structure. It can be seen from FIGS. 13A and B, and 14A and B of the present application that the passages are basically formed by arcs with smaller curvatures to larger curvatures. Although the difference of the curvature is reduced at the connection points, the curvatures remain mismatched i.e., discontinuous, at those points. In the same patent, a design using an elliptic arc to replace the circular arc is also suggested as shown in FIG. 15A. In this design the difference between the curvature of the connecting lines is further reduced; however, the improvement is limited because the discontinuity in the curvature is the same as other conventional designs. This improvement can not be used to effectively reduce the impact load, sliding function, vibration, and noises. The curvature variation of this case is plotted in FIG. 15B for reference.

Linear ball bearings including the linear Guideway, the linear ball bush, and the ball spline are widely used in modem mechanical, semiconductor and automation industries. Because of the demands of high efficiency in manufacturing, the speed requirement of the linear bearing is much higher than the conventional practice. Under this high-speed requirement, the issues of impact, sliding function, and vibration and noise become more and more significant. The conventional design of the reversing path of a linear bearing pays attention simply to the continuity of the slopes of tangent lines at a connecting point. Thus the reversing circuit is mostly made through the composition of straight lines, circular arcs or elliptical arcs with the same tangent at the connecting points. Though the slopes are continuous, the curvatures are not continuous at the connecting points. At the place where the rolling element moves from the linear straight passage to the circular arcs, the radius of the curvature changes rapidly so that it causes the rolling element to turn direction abruptly and a centrifugal acceleration to appear instantaneously. It will also induce extra impact and functional force by the abrupt change in the direction of the rolling element. On the other hand, because of the discontinuity of the curvature at the connecting point the rolling element will have unfavorable jerking, colliding and jostling when passing through the spot of the connection, and will have a less smooth motion and generate enormous noise resulting in a reduction of the mechanical efficiency.

SUMMARY OF THE INVENTION

The object of the invention is to provide a planar or spatial reversing passage circuit to connect the loading and unloading passages in a recirculation path unit of a linear bearing. The specific planar or spatial curves are defined so that the curvature of the curves can be altered continuously from zero to a designated value. Using this characteristic of the curve to connect the reversing passage with the straight loading and unloading passages, elimination of acceleration, reduction of the sliding function and the generating of a smooth reversing motion can be obtained and the high speed and highly efficient linear motion can be achieved.

The present invention can be best understood through the following description and accompanying drawing. The models shown in the appended drawings are presented only for the purpose of reference and description and should not have any limiting effect with respect to the scope of the present invention.

BRIEF DESCRIPTION OF THE DRAWINGS

FIG. 6A is a plot shows another modified Clothoidal curve from FIG. 2A.

FIG. 6B is a plot shows the curvature variation of the curve shown in FIG. 6A.

FIG. 10. is a plot of the reversing path of the present invention formed by a B(2)zier Curve.

FIG. 1 to 10B are the practical application examples of the practical application of the present invention. FIG. 11A to 15B are the conventional reversing passages.

DETAILED DESCRIPTION OF THE REFERRED EMBODIMENTS

In a conventional linear bearing recirculation path design, the technique that makes the connected straight lines, circular arcs or elliptic arcs tangent to each other at the connecting point is generally used to form a slope-continuous closed recirculation path so that the smoothness of the motion of a rolling element passing through the reversing passage can be ensured. Although the continuity of the slope at the connecting point can be obtained through this technique, the curvatures in the vicinity of the connecting points are still discontinuously mismatched and will cause a sharp change of the centrifugal acceleration. The unfavorable sharp changing of the acceleration can generate a tremendous impact force at the reversing passage, causing sliding function, and reciprocal colliding of the rolling elements that will reduce the mechanical efficiency and produce a tremendous level of noise.

Figure 11B:
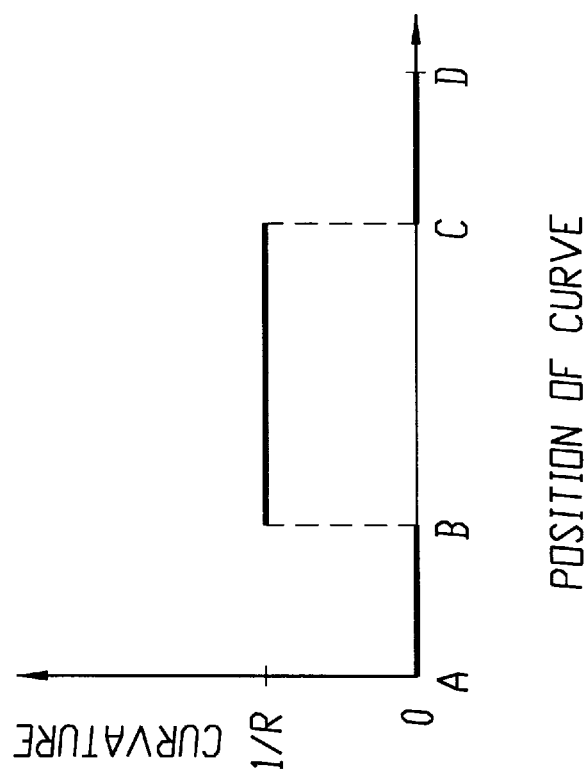
FIG. 11B is a plot shows the curvature variation of the curve shown in FIG. 11A.
Figure 11A:
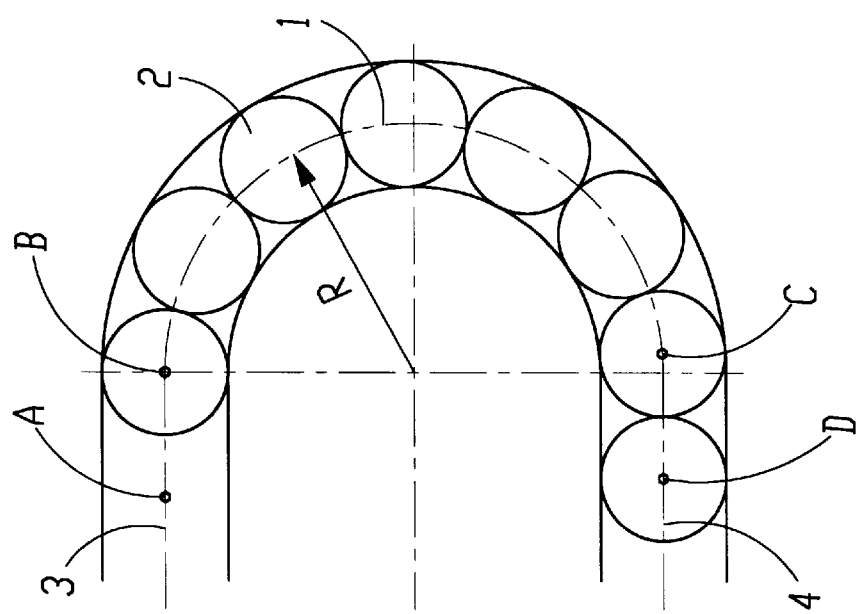
FIG. 11A is a plot shows a conventional reversing passage composed of a piece of semi circular arc.
Figure 12B:
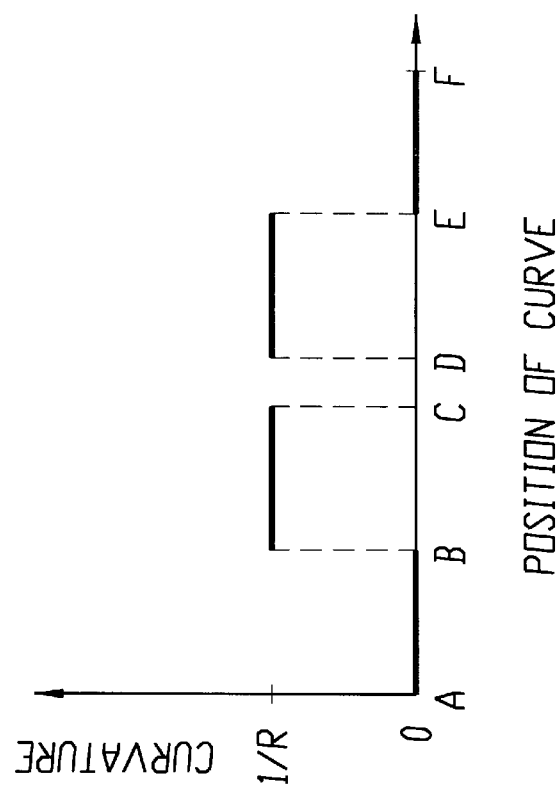
FIG. 12B is a plot shows the curvature variation of the curve shown in FIG. 12A.
Figure 12A:
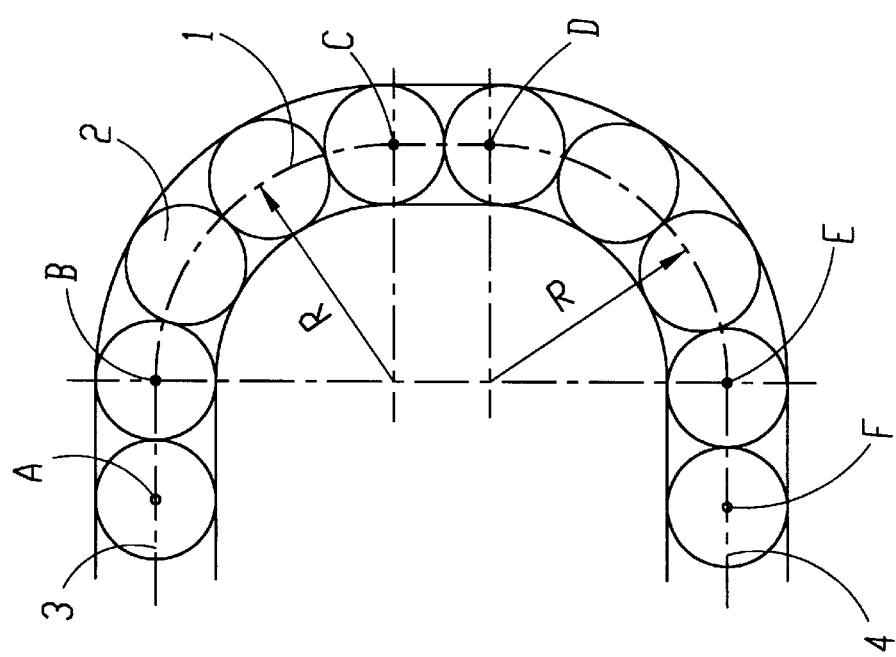
FIG. 12A is a plot shows a conventional reversing passage composed of two pieces of quarter circular arcs and a piece of straight line segment.
Figure 13B:
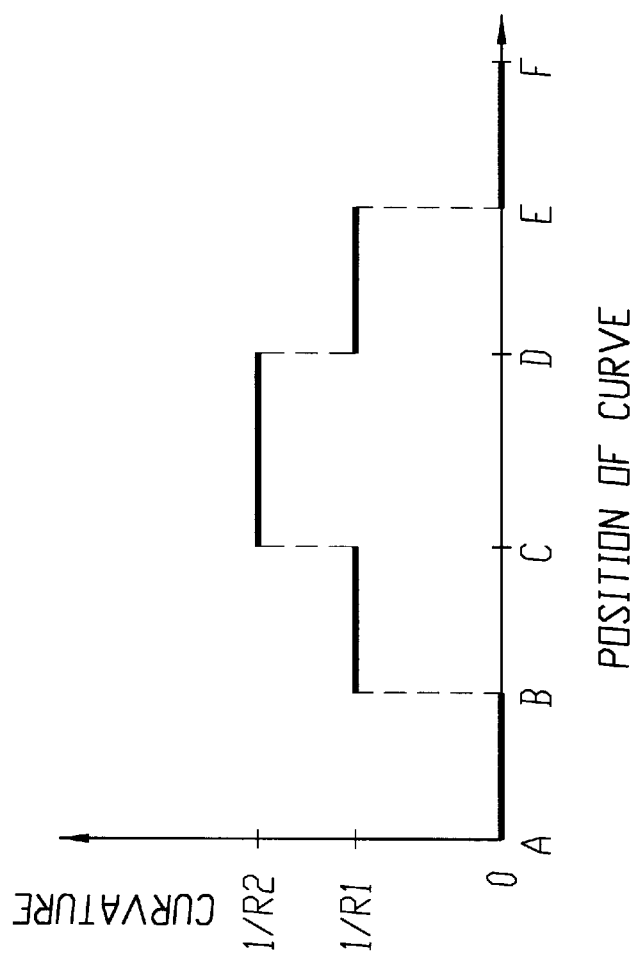
FIG. 13B is a plot shows the curvature variation of the curve shown in FIG. 13A.
Figure 13A:
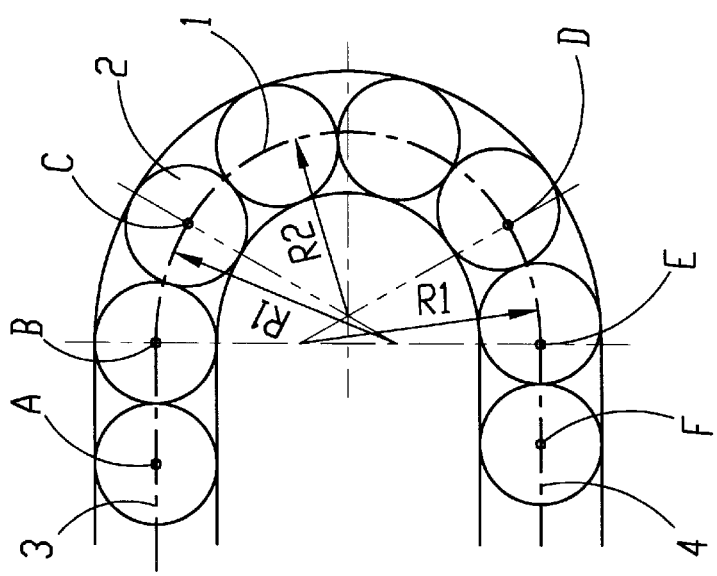
FIG. 13A is a plot shows a conventional reversing passage composed of three pieces of circular arcs.
Figure 14B:
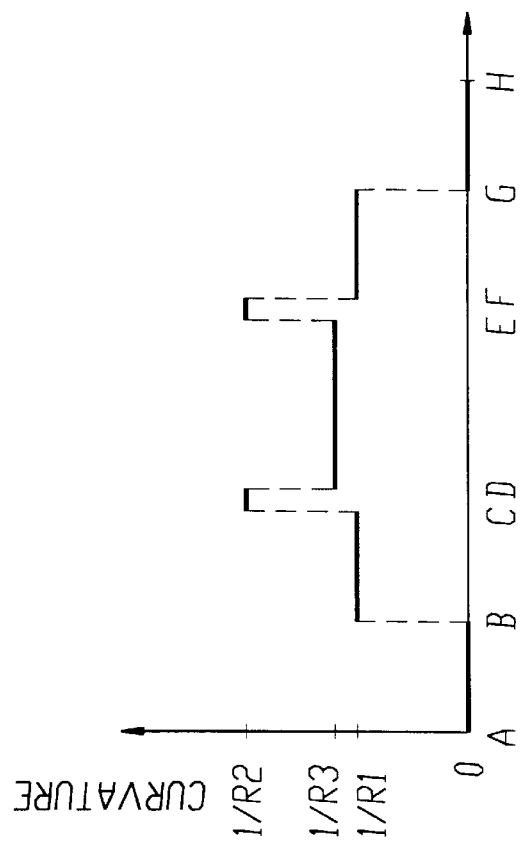
FIG. 14B is a plot shows the curvature variation of the curve shown in FIG. 14A.
Figure 14A:
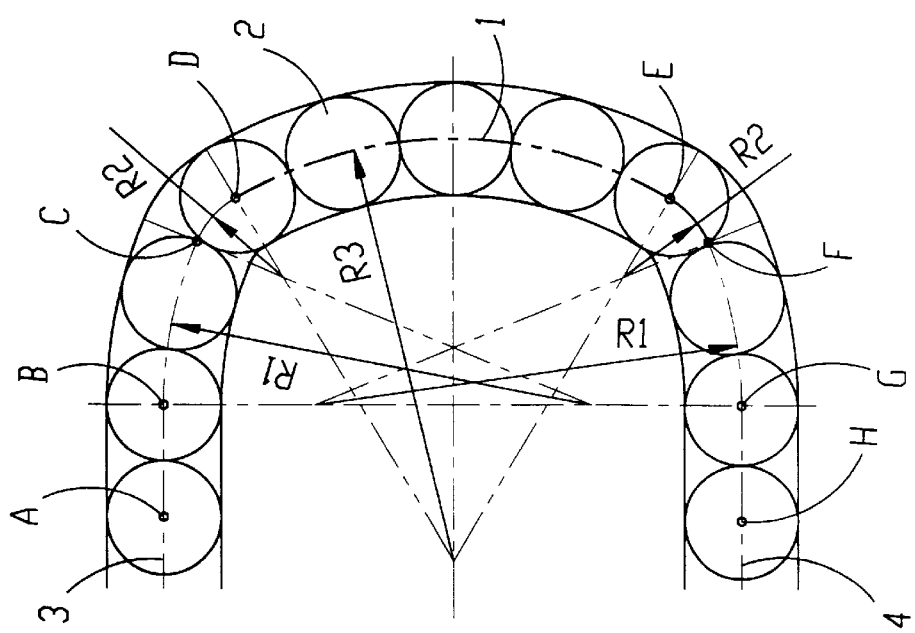
FIG. 14A is a plot shows a conventional reversing passage composed of five pieces of circular arcs.
Figure 15B:
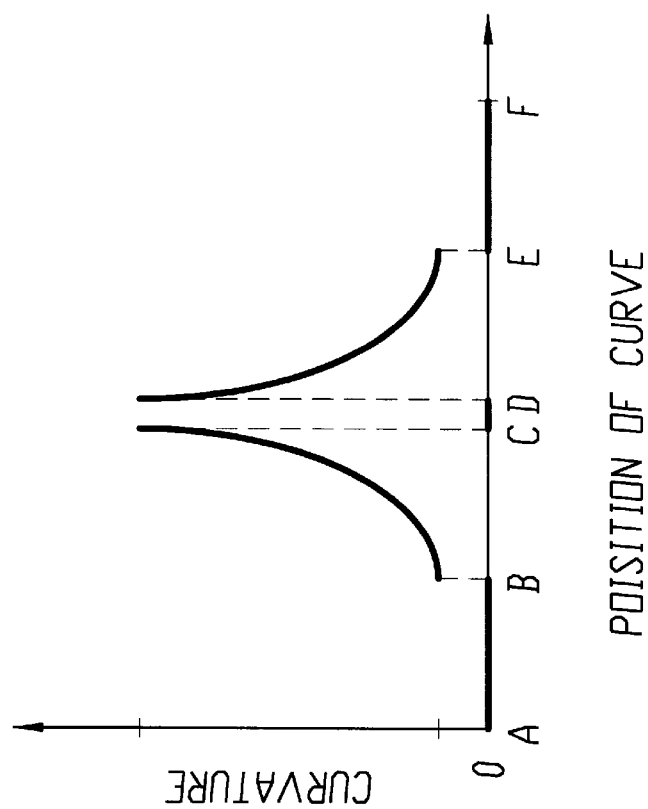
FIG. 15B is a plot shows the curvature variation of the curve shown in FIG. 15A.
Figure 15A:
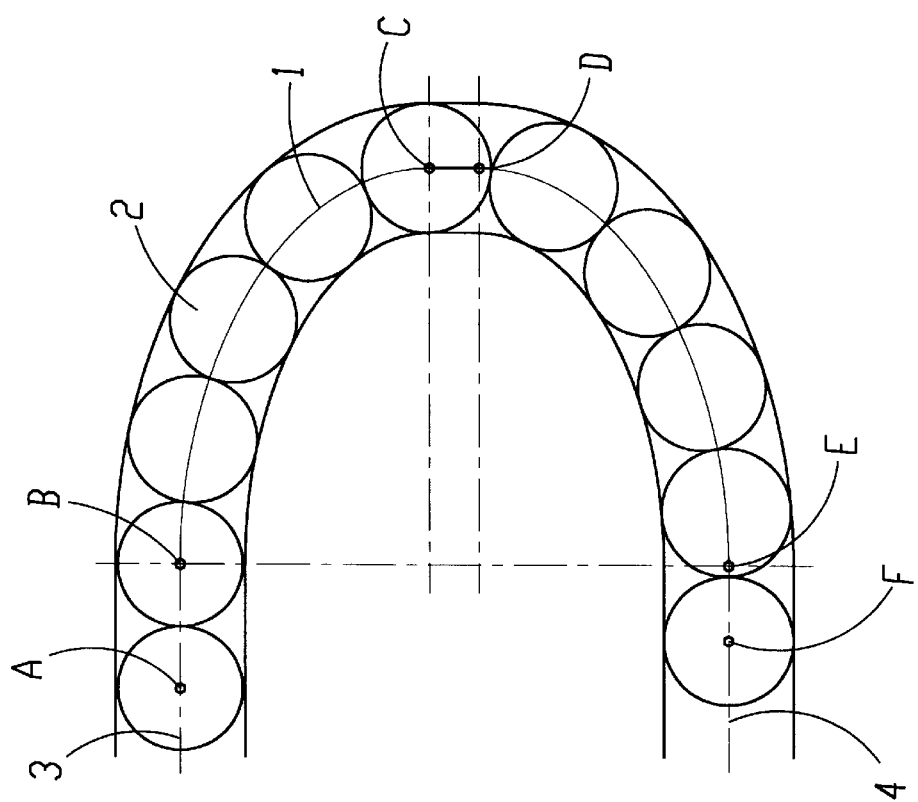
FIG. 15A is a plot shows a conventional reversing passage composed of two pieces of quarter elliptic arcs and a piece of straight line segment.

To overcome the issues raised by the abrupt increase in centrifugal acceleration, the present invention introduces an innovative curvature-connecting technique that can be used to ensure the continuity of the slope as well as the curvature of the whole recirculation passage of a linear bearing. Applying the design methodology of the present invention, the centrifugal acceleration of the rolling element in the reversing passage can be made smooth from zero to a certain design value. Thus the impact force from the rolling element to the reversing wall will be reduced, and sliding function, the noise induced by vibration, and the noise induced by colliding of the rolling bodes can be eliminated. It is well known that the curvature of a moving path will directly affect the centrifugal force on a body when changing directions. It is much better understood through the expression of the $a_n$, the centrifugal acceleration, as $$a_n = \frac{V^2}{r}$$

where, V is the instant linear velocity of the centroid of the moving element, and r is the radius of curvature of the path and is equal to the inverse of the curvature. With the above expression of acceleration, an example of the conventional reversing passage 1 with the curve tangent to each other can be used for explanation as shown in FIG. 11A, where A is the connecting point. Because the curvature of the straight line is zero, the acceleration $a_n$ of element 2 moving along the linear passage is equal to zero as well. On the other hand, while the moving element is passing the connecting point, the acceleration $a_n$ increases abruptly to $V^2/R$ that it means the acceleration is proportional to the curvature. In this example, curve 1 is a circular arc and its radius R is a constant, with the result that the acceleration of the rolling element increases abruptly to a certain value at the instance of the rolling element moving into the reversing path from a straight line. Furthermore, the direction of the acceleration of the rolling element also changes abruptly and will inevitably cause jerking of the rolling element and induce an impact force against the wall of the reversing passage.

Figure 1:
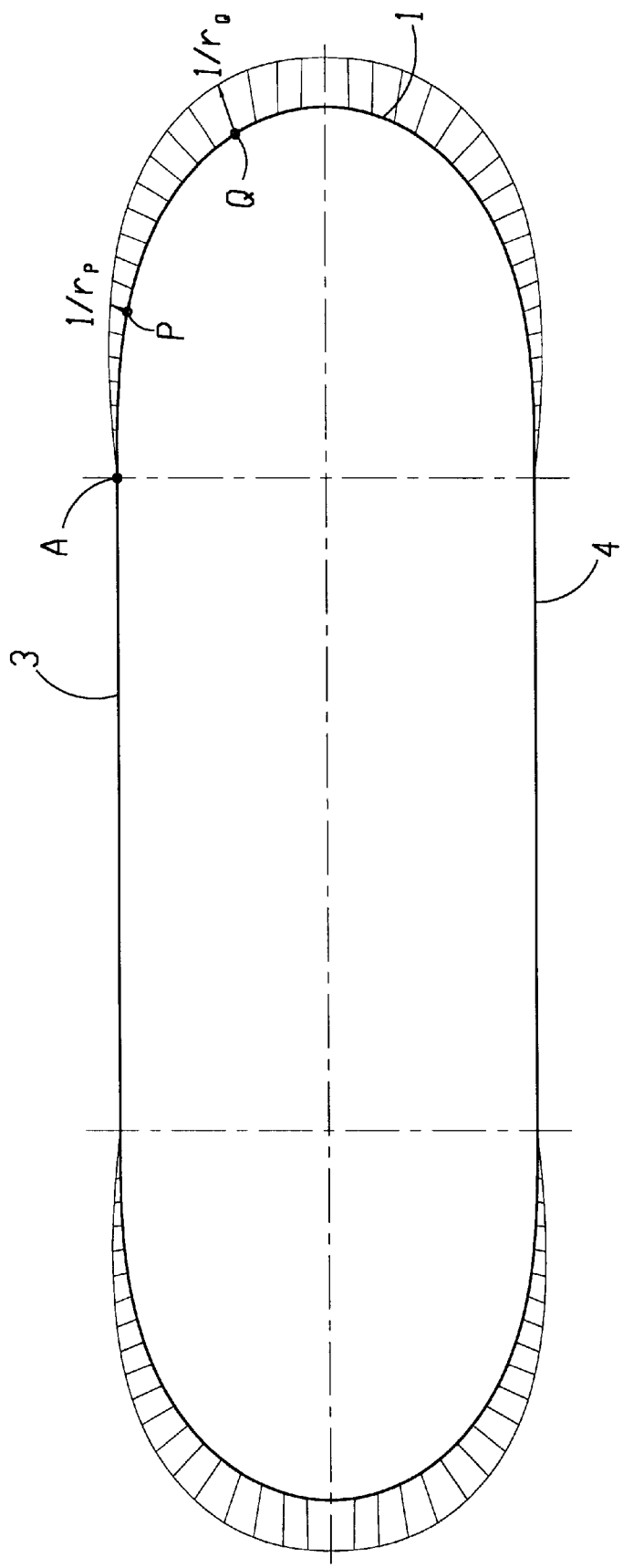
FIG. 1. is a plot of the curvature in the reversing passage of the present invention.

FIG. 1 shows the reversing passage designed by the connecting technique of the present invention, where the curvature of the passage varies continuously from zero to 1/rp and to $1/r_Q$ when element 2 passes from point A to point P and to point Q, respectively. The centrifugal acceleration thus changes smoothly from zero to $V^2/rp$ and then to $V^2/rQ$, respectively. Since the centrifugal acceleration varies continuously, the jerk and collision of the rolling element 2 can be avoided at the conjunction point. The linear bearing recirculation design unit of the present invention uses the curvature as the design parameter. To use the principle of the present invention for practical application, there are certain specific planar or space curves such as the Clothoidal Curve (also called a Cornu curve, or Euler's Curve) or Bezier Curve, or other kinds of similar curves having the required curvature properties. It is convenient to use the Clothoidal curve to explain the fundamental idea of the present invention, because the curvature of a Clothoidal curve is proportioned to its arc length from the initial point of the curve. Hence, to show clearly the concept of the invention the we will use the Clothoidal curve as an example in the following section.

The general form of a Clothoidal curve can be expressed as $$(X, Y) = (X_0, Y_0) + \left[ h \int_0^u \cos(f(u)) du, h \int_0^u \sin(f(u)) du \right]$$

where (X(u), Y(u)) is a point in the Clothoidal curve and $(X_o, Y_o)$ is the starting point of the curve, h is a scalar constant, u is a measurement of the arc length from the starting point of the curve, and f(u) is a tangent function of curve that it is equal to the tangential angle of the curve at the point (X(u), Y(u)). The function f(u) of the Clothoidal curve is most often defined by $$f(u) = \frac{\pi u^2}{2}$$

Hence, the curvature function of the curve c(u) can be defined as $$c(u) = \frac{\pi u}{h}$$

It can be seen that the curvature of the curve segment varies gradually and continuously from zero to a certain designed value as expected.

Figure 2B:
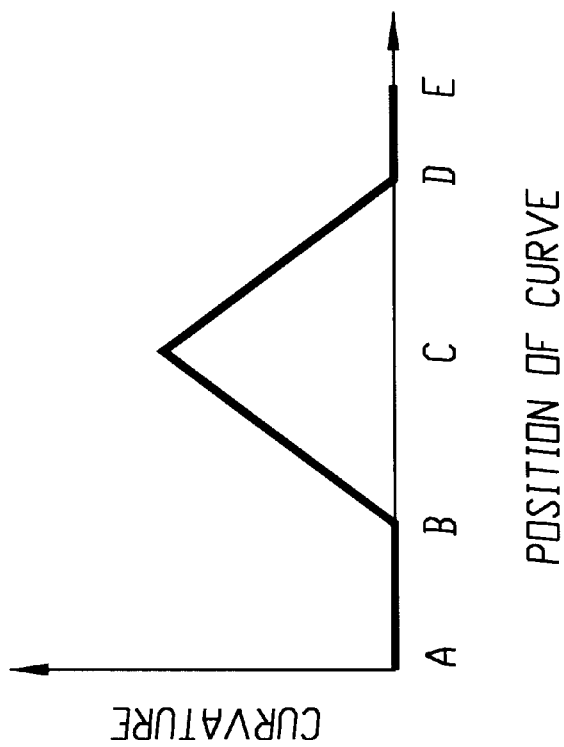
FIG. 2B is a plot shows the curvature variation of the curve shown in FIG. 2A.
Figure 2A:
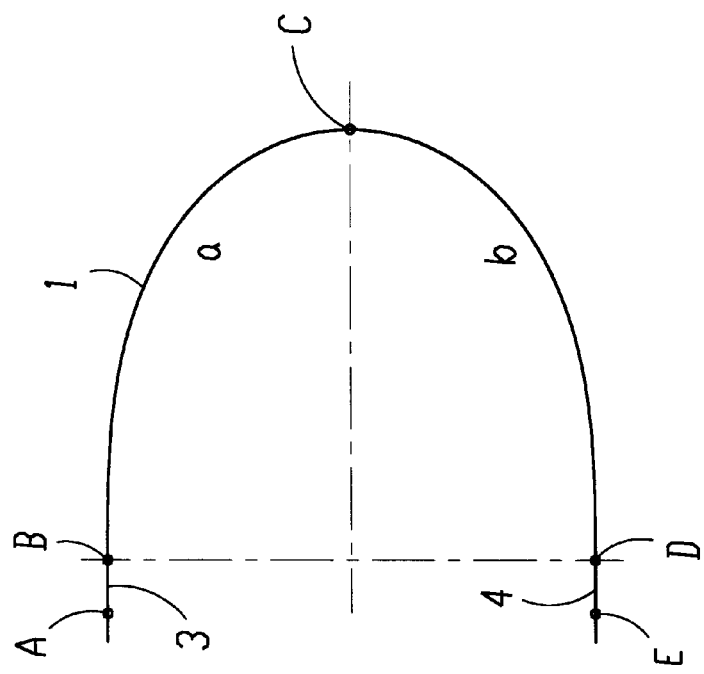
FIG. 2A is a plot of the reversing passage composed of a Clothoidal curve.

An example can be used to describe the present invention is shown in FIG. 2A, where reversing the passage 1 consists of a symmetric Clothoidal curve pair a and b. It can be seen that one Clothoidal curve is connected to the loading passage 3 at the starting point and the other Clothoidal curve is connected with unloading passage 4 at the other end, where the tangential angle and the curvature of the whole reversing passage remain continuous and the curvature increasing gradually from zero to a certain value. The curvature variation of the curve in FIG. 2A is plotted in FIG. 2B, where the curvature of the passage 1 increases from zero at the entrance B then decreases to zero at the exit D, the curvature varying continuously so that the drawback of abruptly changing of acceleration in a conventional design can be eliminated.

Figure 3B:
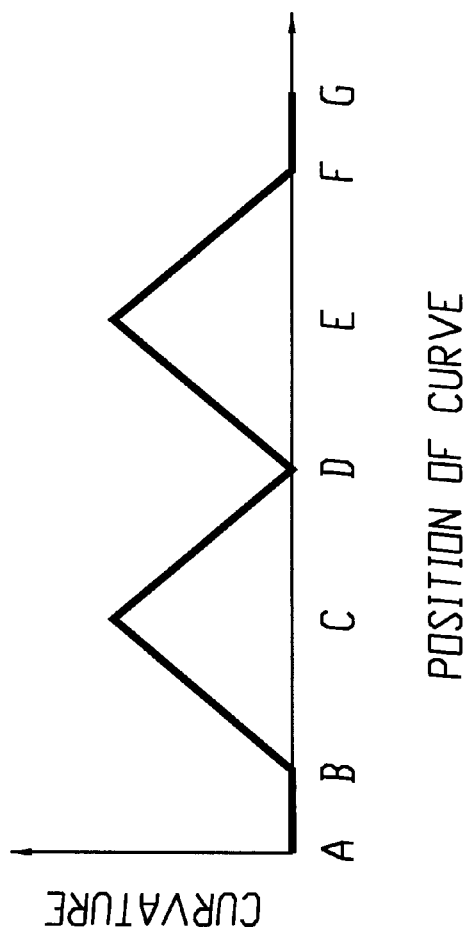
FIG. 3B is a plot shows the curvature variation of the curve shown in FIG. 3A.
Figure 3A:
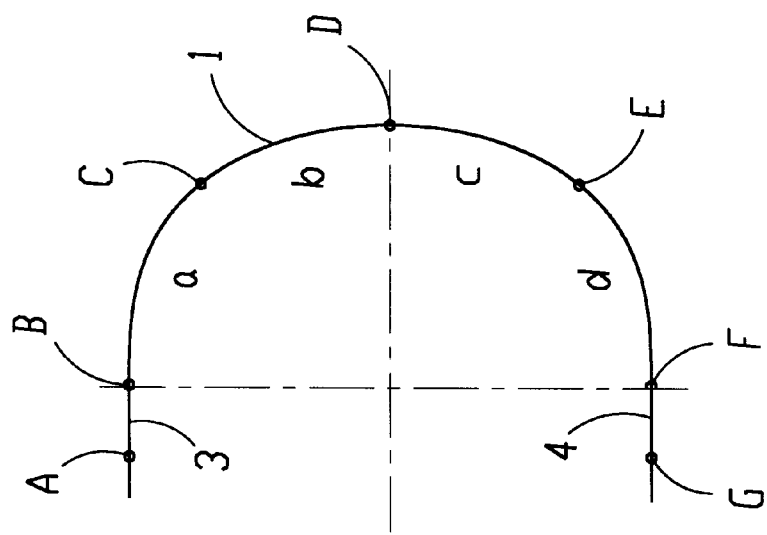
FIG. 3A is a plot shows the modified Clothoidal curve from FIG. 2A.
Figure 4B:
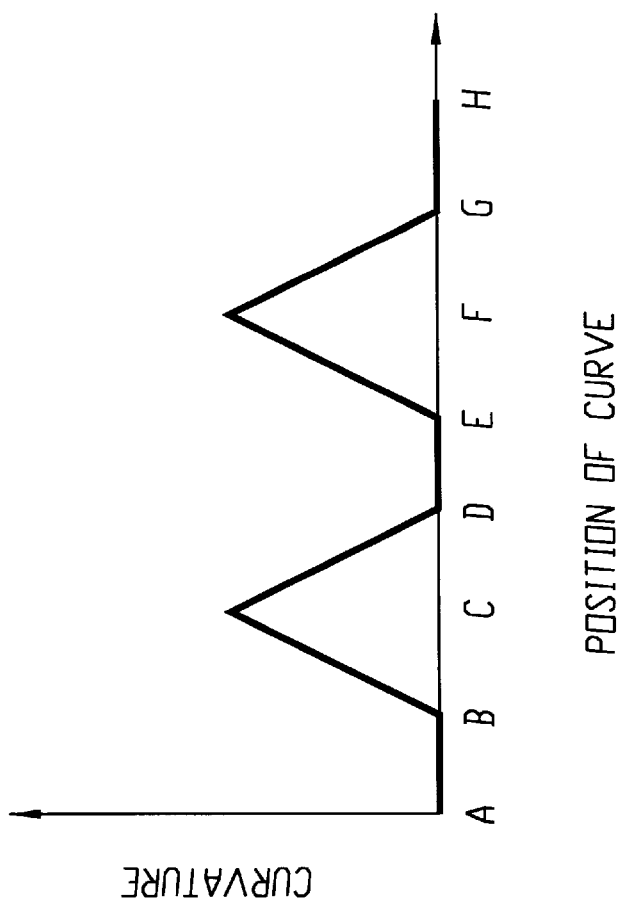
FIG. 4B is a plot shows the curvature variation of the curve shown in FIG. 4A.
Figure 4A:
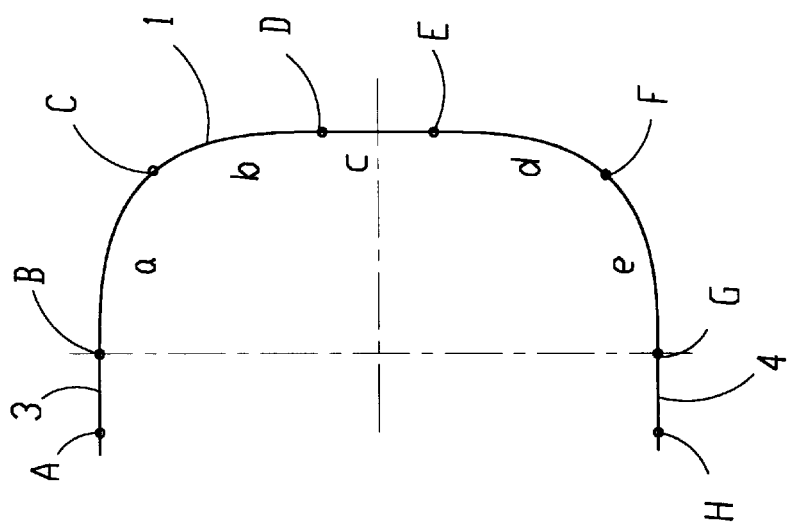
FIG. 4A is a plot shows another modified Clothoidal curve from FIG. 2A.

Other examples applying the Clothoidal curve in the reversing passage are shown in FIGS. 3A to 7B. In FIG. 3A, the reversing passage consists of four Clothoidal curves a, b, c, and d. FIG. 4A shows a reversing passage composed of four Clothoidal curves a, b, d, e and a straight line segment c. The tangential angle and the curves of the above examples are kept continuous through the whole path.

In the above examples the curvature functions are all linear functions of the arc length measured from the starting point, i.e., the curvatures vary continuously and proportionally linearly to the arc length at the reversing passage. Like the linear function, the higher order polynomials or sinusoidal function can also be used as the curvature function. A quadratic polynomial is used as an example, in which the curvature can be taken as $$C(u) = \pi u(1-u)$$

Then the curve (X(u), Y(u)) can be expressed as $$X(u) = \int_0^u \cos\left( 6\pi \left( \frac{u^2}{2} - \frac{u^3}{3} \right) \right) du$$

$$Y(u) = \int_0^u \sin\left( 6\pi \left( \frac{u^2}{2} - \frac{u^3}{3} \right) \right) du$$

Figure 5B:
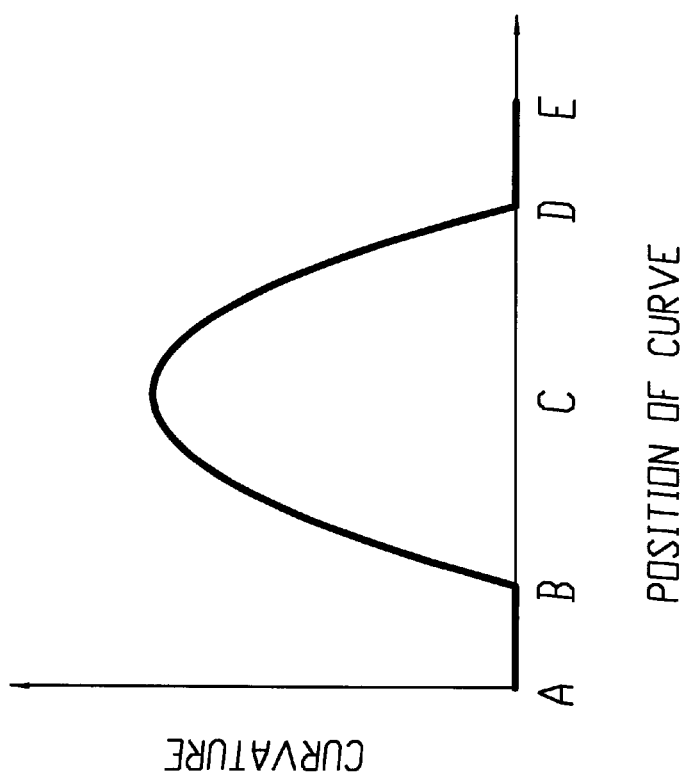
FIG. 5B is a plot shows the curvature variation of the curve shown in FIG. 5A.
Figure 5A:
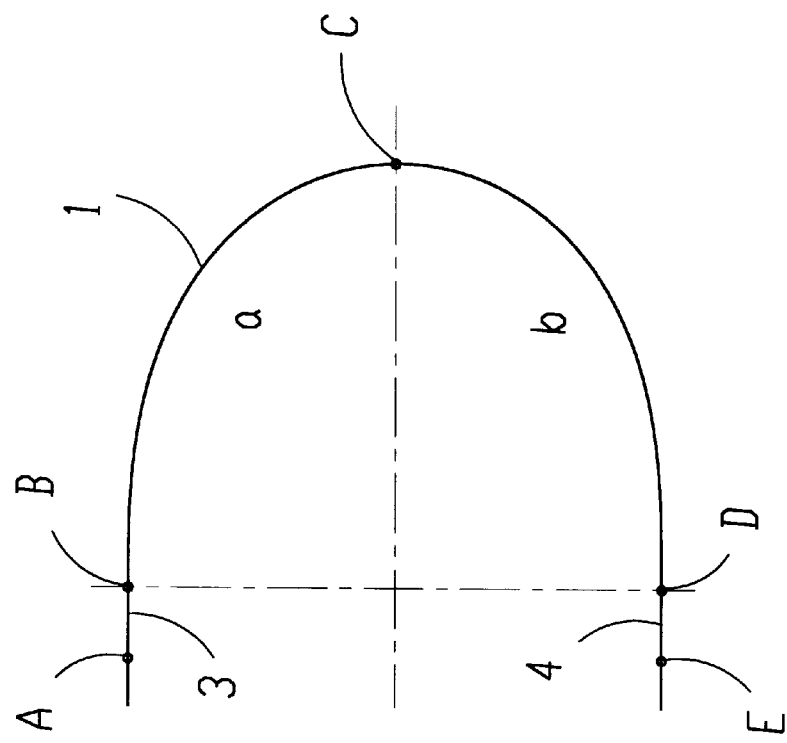
FIG. 5A is a plot shows another modified Clothoidal curve from FIG. 2A.

The curve is plotted in FIG. 5A with the upper integration limit u=1 and the curvature of the curve is plotted FIG. 5B. Similarly, the example using a sinusoidal function as the curvature function can be chosen as $$C(u) = \pi \sin (2u)$$

Then the curve (X(u), Y(u)) can be expressed as $$X(u) = \int_0^u \cos(\pi \sin(u^2)) du$$

$$Y(u) = \int_0^u \sin(\pi \sin(u^2)) du$$

The curve is plotted in FIG. 6A with the upper integration limit u=π/2. The curvature of the curve is plotted FIG. 5B.

Figure 7:
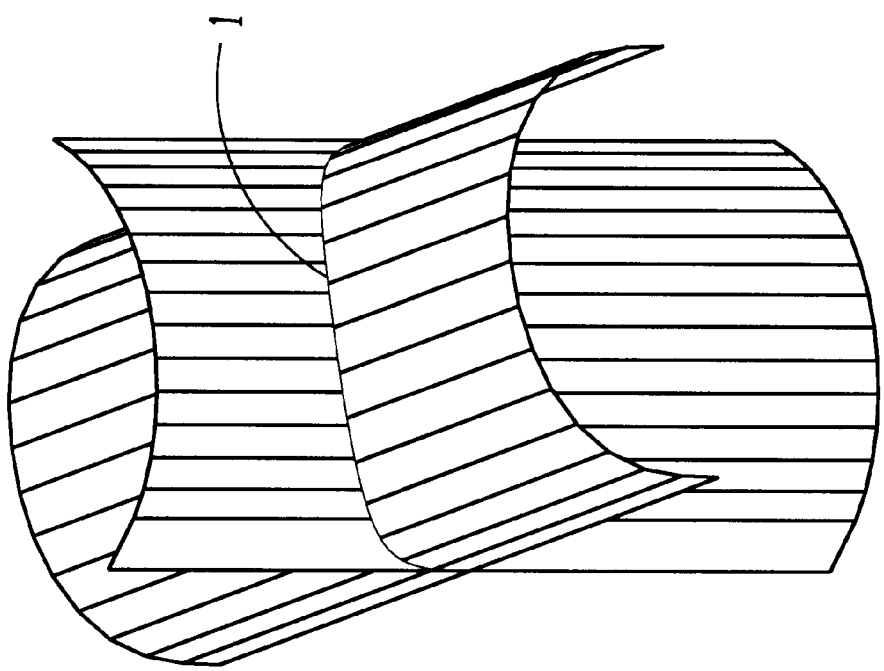
FIG. 7 is a plot shows the curve formed by the intersections of two Clothoidal planes.

The above are examples using planar Clothoidal curves in the design of the reversing passage of a linear bearing to describe the present invention. The present invention can also be used to design spatial Clothoidal curves for three dimensional reversing passages as the planar Clothoidal curves. One example is to use two mutually intersecting Clothoidal surfaces to form a three dimensional curve by the intersecting line. The Clothoidal surface mentioned above is defined as the surface formed by projecting the planar Clothoidal curve uniformly along the normal direction of the plane of the planar Clothoidal curve. FIG. 7 shows an example resulting from the above designing method, where the three dimensional line for the reversing passage is formed by the line intersected by two Clothoidal surfaces. The two Clothoidal surfaces are formed by the projection of two planar Clothoidal curve segments that are connected directly to the ends of the loading and the unloading passages, while one planar Clothoidal curve locates on the plane connecting the two straight line and the other planar Clothoidal curve locates on the plane perpendicular to the previously mentioned plane.

Figure 8A:
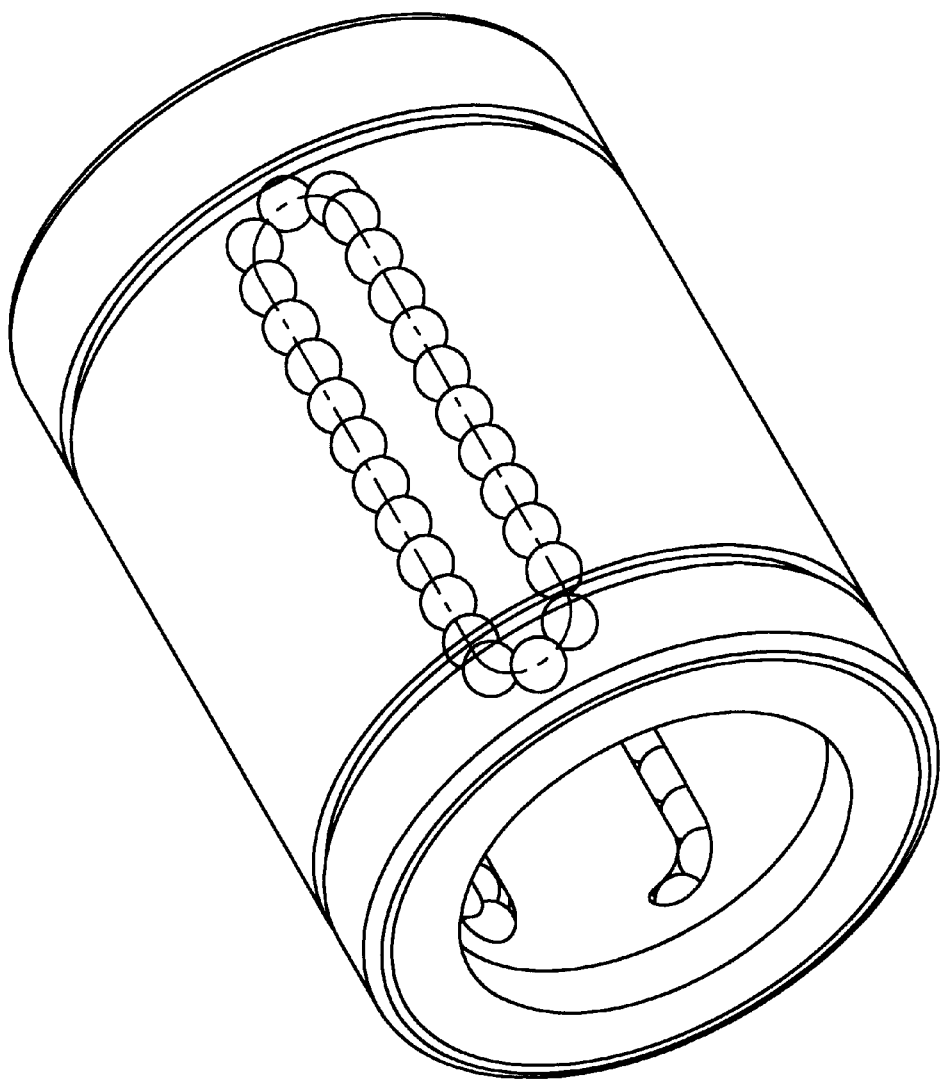
FIG. 8A is the recirculation path of a linear ball bush.

Another method using Clothoidal curve in the design of spatial reversing passages is to generate Clothoidal curve on an assigned curved surface. One example is to generate the Clothoidal curve in a cylindrical surface. Such a curve is especially suitable in the design of the reversing passage of a linear ball bush as shown in FIG. 8A. Details of an application of the method described above will be explained in the following section.

In a practical application of the product design, one can also connect the specific curves of the present invention (i.e. the curves with varying continuous curvature and other above-mentioned properties) to straight line segments, circular arcs, elliptic arcs and other kinds of curve segments to form a recirculation path that is needed to fulfill the constraints of the shape or dimensions, while the curvature of two connecting curve segments immediately next to the connecting point are kept continuous.

Figure 8B:
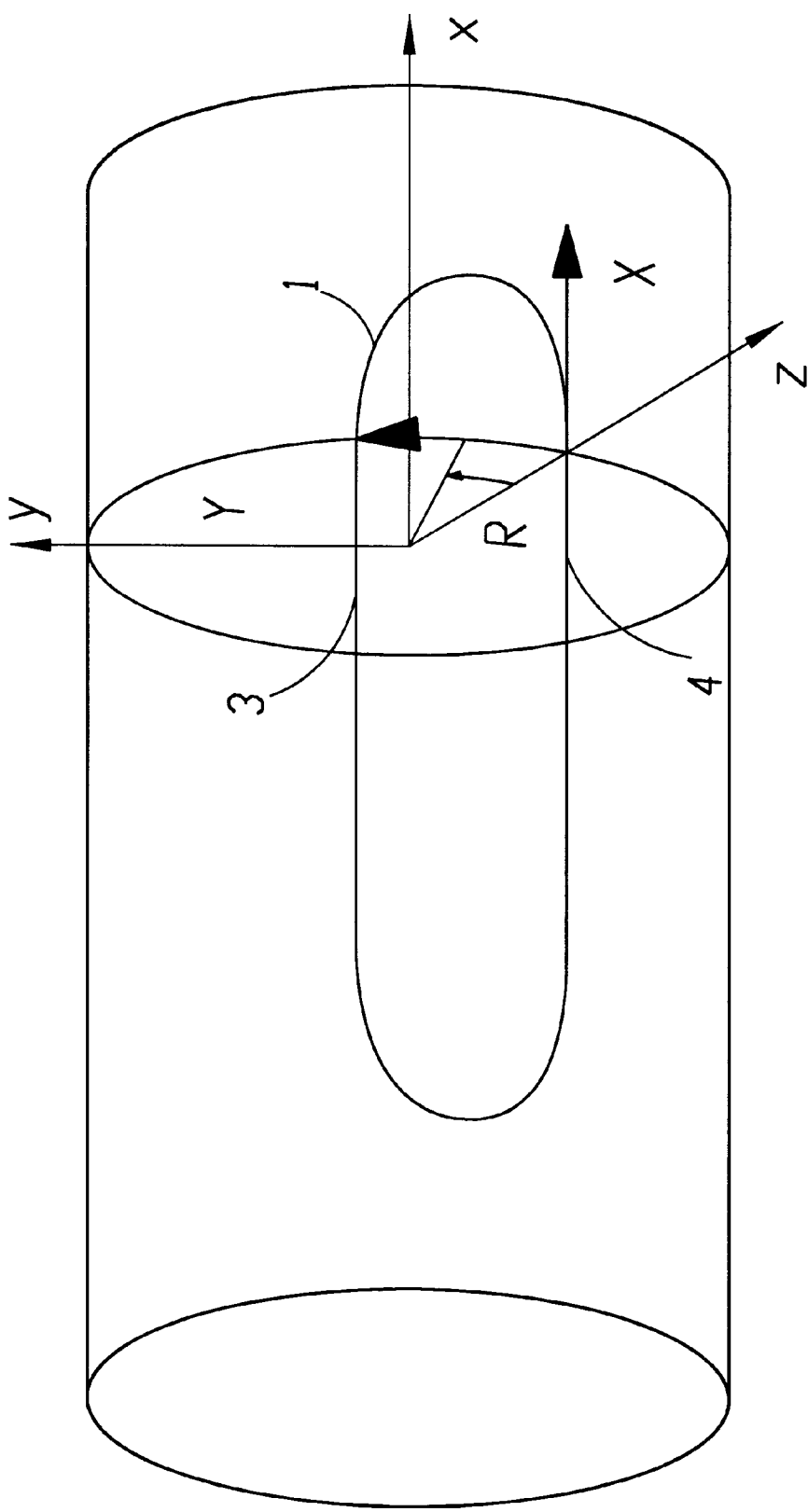
FIG. 8B is a Clothoidal curve on a cylindrical coordinate system.

FIG. 8A shows an example of the application of the present invention to a linear ball bush in which the recirculation path is formed on a specific cylindrical surface to meet the requirement of the product design. FIG. 8B shows the detailed design process of the example, where the radius of the cylindrical surface is R. It can be seen from the FIG. 8B that a region of the plane X-Y can be mapped to a cylindrical surface through x=X
θ=Y/R Hence the spatial Clothoidal curve (x(u), y(u), z(u)) can be expressed as $$x(u) = X = \cos\left(\int_0^u \cos(f(u))du\right)$$

$$y(u) = R\sin(Y/R) = R\sin\left(\frac{\int_0^u \sin(f(u))du}{R}\right)$$

$$z(u) = R\cos(Y/R) = R\cos\left(\frac{\int_0^u \sin(f(u))du}{R}\right)$$

It can be verified that the arc length of the spatial Clothoidal curve still is equal to u and its curvature function becomes $$C(u) = \sqrt{\left(\frac{d^2x}{du^2}\right)^2 + \left(\frac{d^2y}{du^2}\right)^2 + \left(\frac{d^2z}{du^2}\right)^2} = \sqrt{\left(\frac{df(u)}{du}\right)^2 + \left(\frac{\sin^2(f(u))}{R}\right)^2}$$

From this equation, we can see that there is a modification term of the curvature of the spatial Clothoidal on a cylinder compared with that of a planar Clothoidal curve. Nevertheless, the continuity of the curvature and other characteristics remains the same for this spatial Clothoidal curve.

The above is an example that can be applied to a linear ball bush. The primary aspect of the example is to apply the property of the Clothoidal curve that the curvature can vary continuously from zero to a designated value to connect the loading and unloading passages to make the rolling elements move more smoothly.

Figure 9A:
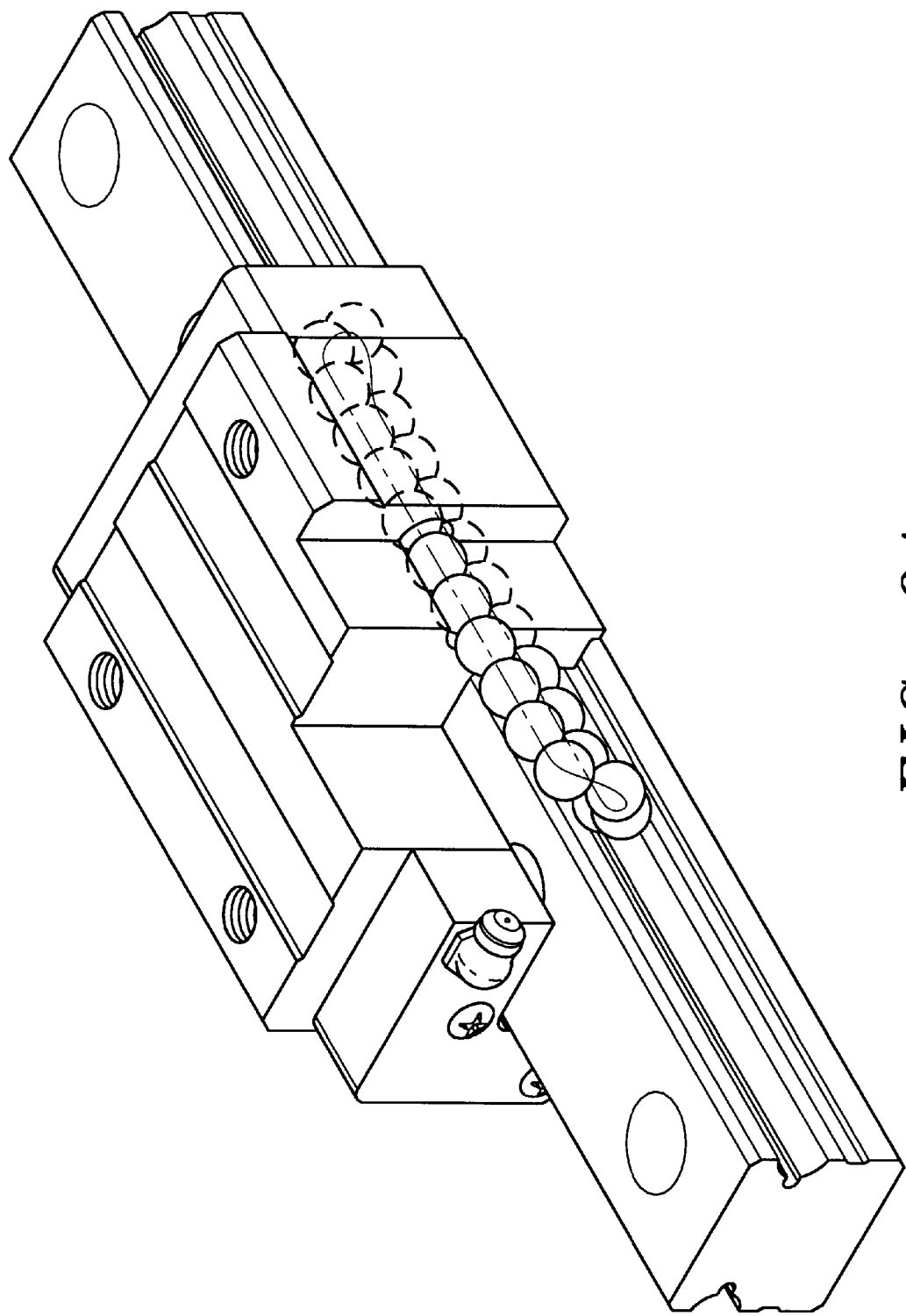
FIG. 9A. is a recirculation path of a rolling ball linear guideway.
Figure 9B:
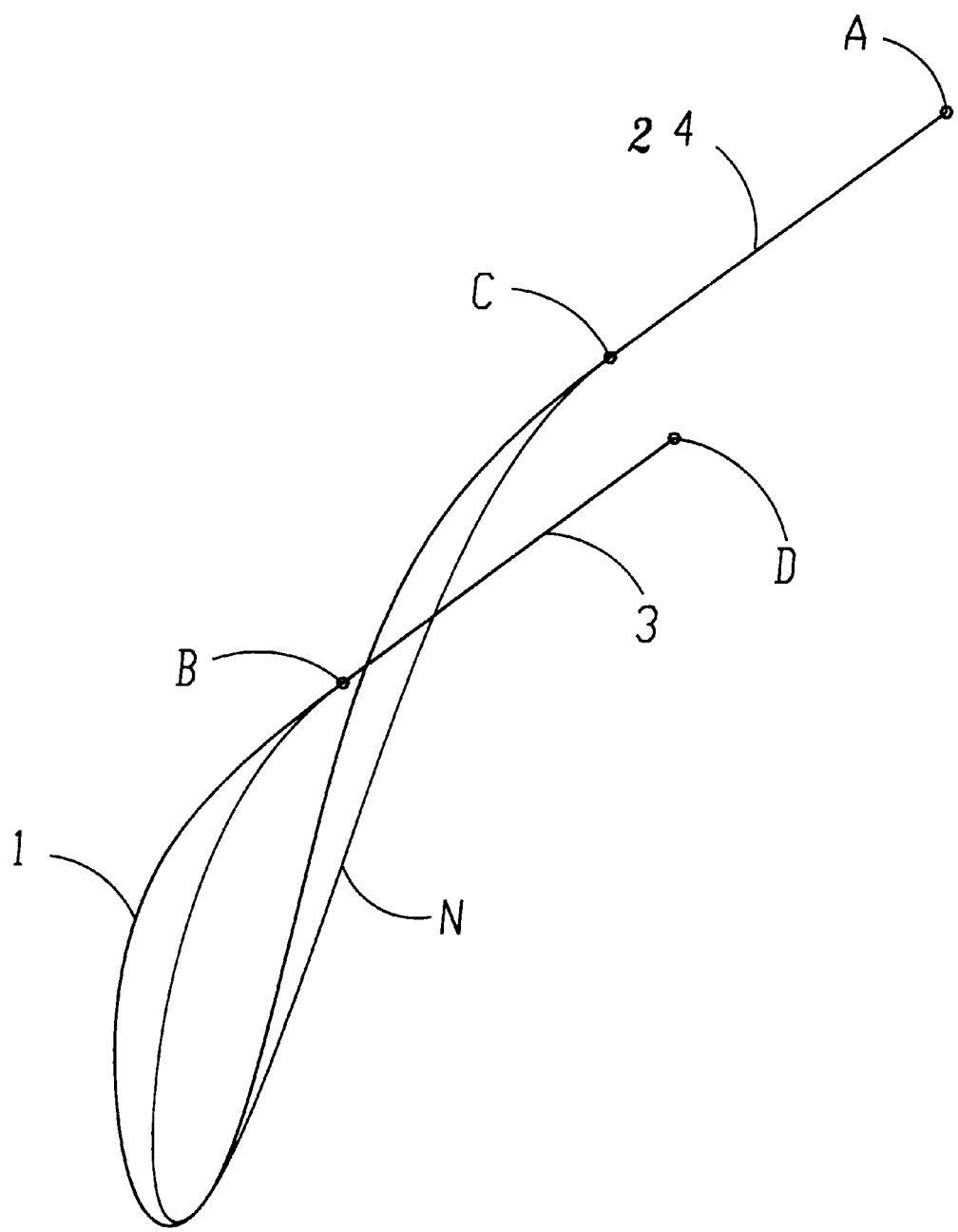
FIG. 9B. is a comparison of the reversing passages between a conventional recirculation path and those of the present design.
Figure 9C:
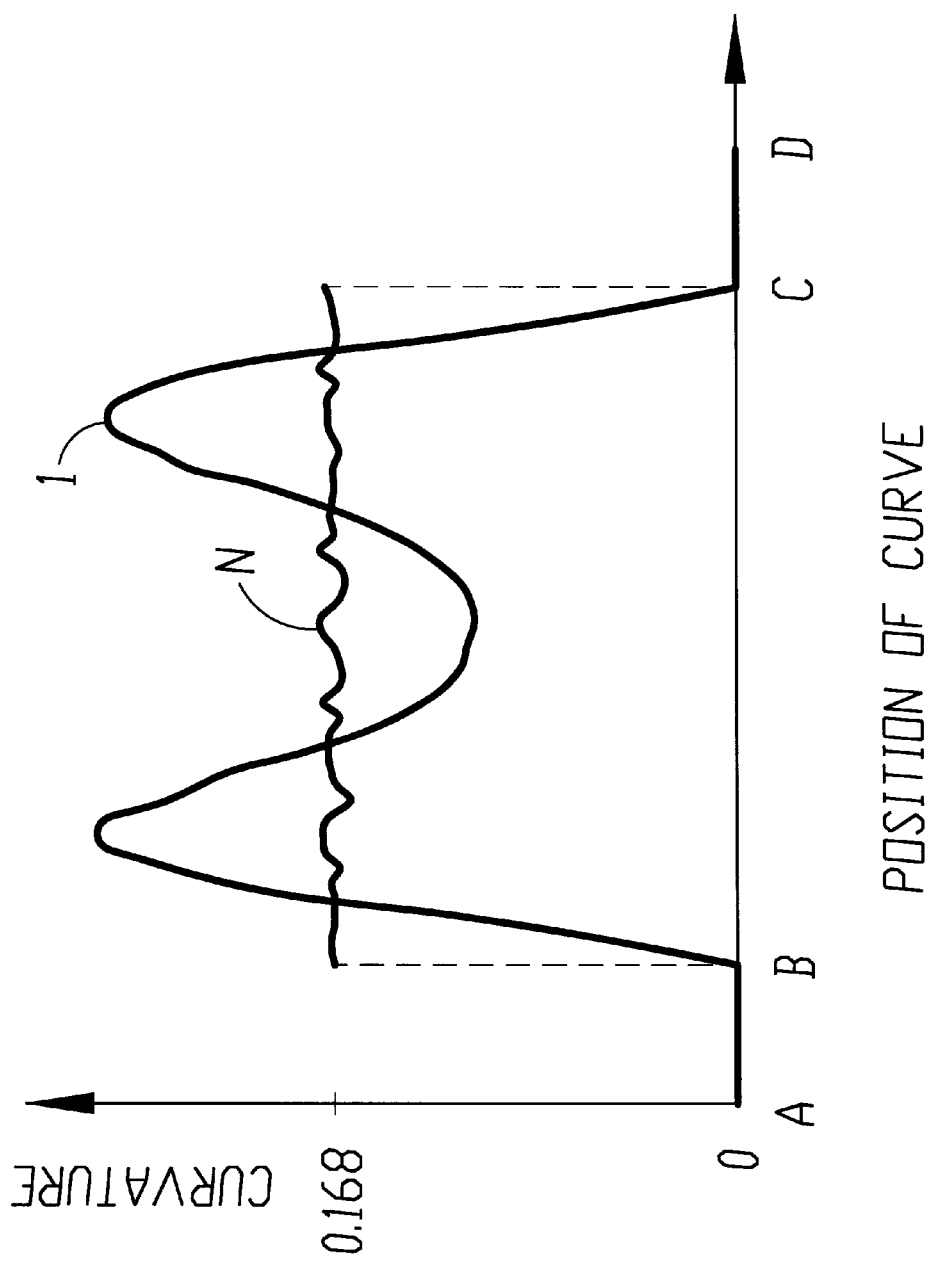
FIG. 9C. is a plot shows the curvature variation of the curve shown in FIG. 9B.

In addition to the Clothoidal curve, there are other kinds of curves that the curvature can vary continuously such as a Bezier curve. FIG. 9A shows a practical example applying a fifth order Bezier curve in the reversing path design of a linear guideway. In FIG. 9B, the reversing passage N is designed by the conventional method, by stretching semi-circular arcs connected to the two linear loading and unloading passages, along the normal direction of plane where the two linear passages located. This curve is tangent to the linear loading and unloading passages which that the slope of the tangents is, at the connecting point, kept continuous. Although it looks smooth at the connecting point of the curve and the linear passages from the view point of geometry, the rolling element will not be able to run smoothly at the point from the view point of dynamics. It can be seen from FIG. 9C that the curvature jumps to 0.168 the conventional design, so that the problems caused by the mismatching of the curvature as mentioned before will inevitably take place.

Figure 10B:
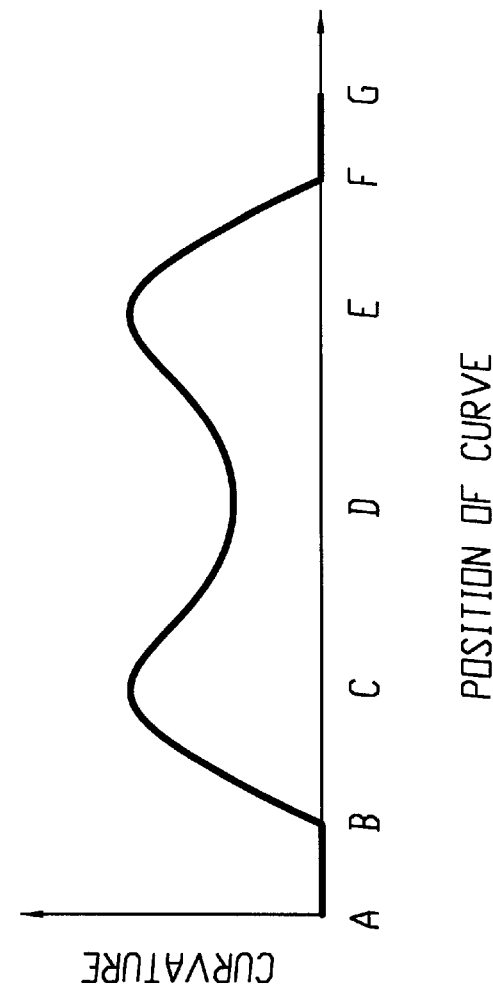
Figure 10A:
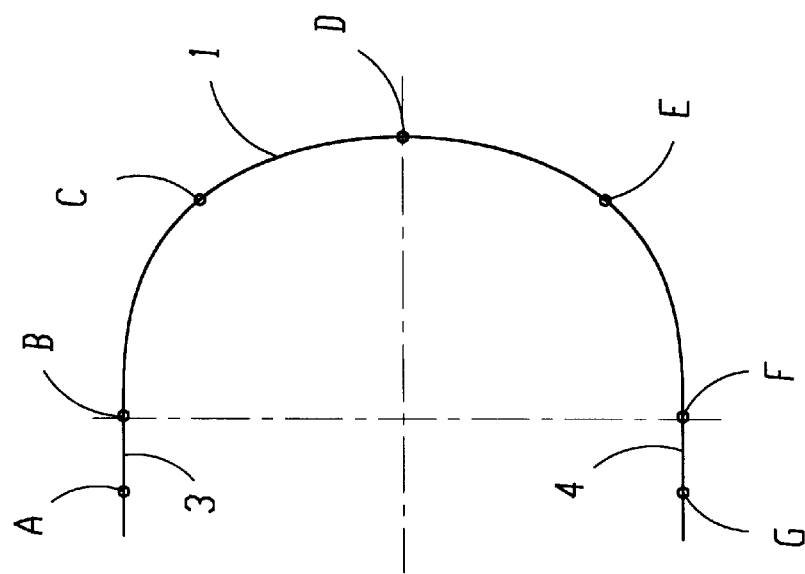

FIG. 10A shows a curve using the Bezier curve based on the present invention to form a reversing passage. It can be seen from FIG. 10B that both the slope and curvatures are continuous in the neighborhood of the connecting points B, F of the reversing passage. Thus, the abrupt centrifugal acceleration will be diminished and the sliding function and noise will be reduced accordingly, so that the circulation motion of the rolling element will be made smooth to satisfy the object of high-speed and high-efficiency.

Although the primary object of the present invention is to keep the continuity of the curvature of the reversing passage in a linear bearing, minor modifications such as chamfering, rounding corners at the ends of an infinite circulating passage linear guideway, or adding a counter bore for easy assembly are also within the scope of the present invention.

Besides the above examples, the invention can also be used in the design of the rolling element passages in other kind of linear motion elements or modules such as linear guideways, linear ball bushes, ball splines, linear stage and etc. The rolling elements of the present invention may include rolling balls, rollers or other kinds of rolling elements.

The application examples mentioned above are used for the detailed description of the object, characteristics and effects of the present invention. It will, off course, be understood that various variations may be made by adroit people, who are familiar with the field of the present technique, in the form details, arrangements and proportions of the parts to conform to specific requirements of use and to design preferences, without departing from the scope of the invention in the following claims.

What is claimed is:

1. A recirculation path unit for rolling elements, comprising a linear loading passage, a linear unloading passage, and two direction reversing passages connecting ends of the linear loading and unloading passages to form a recirculation path for the rolling elements, wherein slopes of said linear and direction reversing passages vary continuously at connection points between the linear and direction reversing passages, and wherein curvatures of said linear and direction reversing passages vary continuously throughout said recirculation path.

2. A recirculation path unit as claimed in claim 1, wherein said curvatures vary continuously from a curvature of zero for said linear passages to a predetermined maximum curvature in said direction reversing passages.

3. A recirculation path unit as claimed in claim 1, wherein said recirculation path includes three-dimensional curved sections formed by projecting planar direction reversing passages whose curvatures vary continuously in a direction normal to the plane of planar direction reversing passages.

4. A recirculation path unit as claimed in claim 1, wherein said direction reversing passages including arc segments selected from the group consisting of circular arcs, elliptic arcs, and other arcs, said arc segments being connected to said linear passages by connecting segments whose curvatures vary continuously from one end to another.

5. A recirculation path unit as claimed in claim 1, wherein said direction-reversing passages form Clothoidal curves.

6. A recirculation path unit as claimed in claim 1, wherein said direction-reversing passages are formed by two mutually intersecting Clothoidal surfaces to form a three dimensional curve.

7. A recirculation path unit as claimed in claim 1, wherein said direction-reversing passages are formed by projection of two planar Clothoidal curve segments connected directly to ends of the loading and unloading passages, one of said planar Clothoidal curves segments being located a plane connecting the linear passages, and the other Clothoidal curve being located in a plane perpendicular to the plane connecting the passages.

8. A recirculation path unit as claimed in claim 1, wherein said direction-reversing passages are formed by generating a Clothoidal curve on a cylindrical surface.

9. A recirculation path unit as claimed in claim 1, wherein said direction-reversing passages form planar Bezier curves.

* * * * *